Taylor & Davis,
Boring Brush Blocks.
Nº 5974. Patented Dec. 19, 1848.
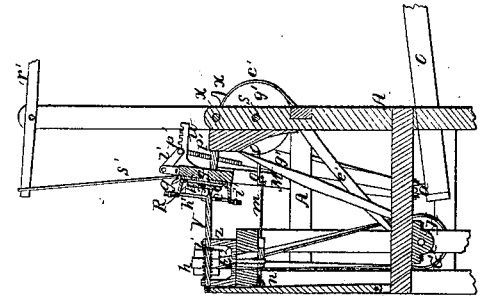
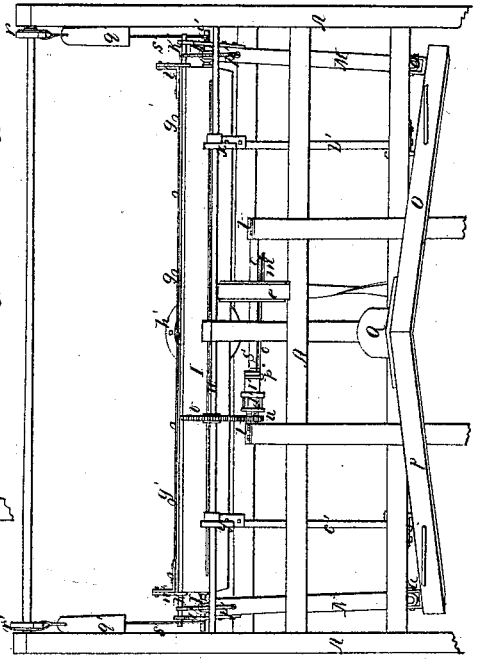
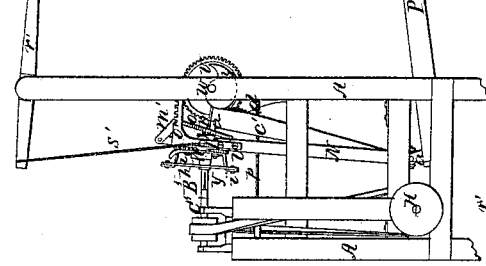
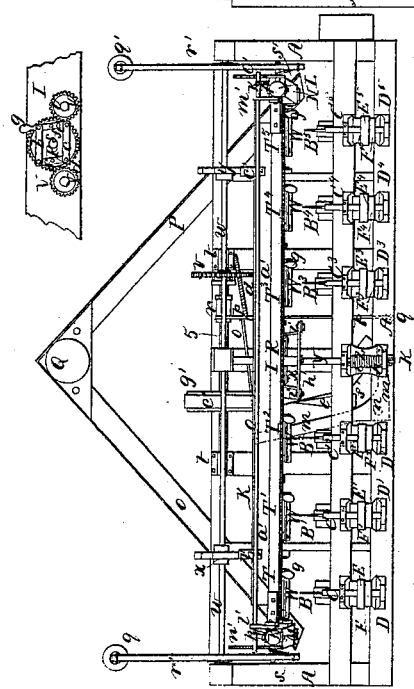
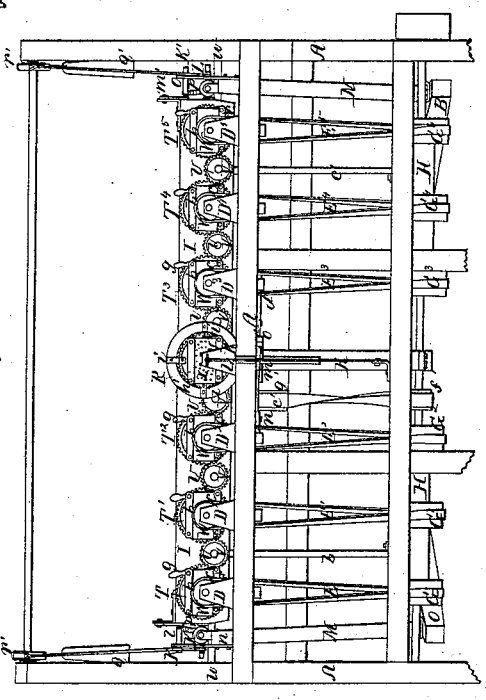

UNITED STATES PATENT OFFICE.

S. TAYLOR AND A. R. DAVIS, OF EAST CAMBRIDGE, MASSACHUSETTS.

MACHINERY FOR BORING BRUSH-BLOCKS.

Specification of Letters Patent No. 5,974, dated December 19, 1848.

*To all whom it may concern:*

Be it known that we, SAMUEL TAYLOR and ABBOT R. DAVIS, of East Cambridge, in the county of Middlesex and State of Massachusetts, have invented a new and useful Machine for Boring Brush-Blocks; and we do hereby declare that the same is fully represented and described in the following specification and accompanying drawings, letters, figures, and references thereof.

Of the said drawings, Figure 1, denotes a top view of our said machine. Fig. 2, is a front elevation of it. Fig. 3, is an end view of it. Fig. 4, is a rear elevation, and Fig. 5, is a central vertical and transverse section.

The object of our invention is to bore in several brush blocks, at one and the same time, the holes for the reception of the bristles.

In the said drawings A, denotes the frame work for supporting the operative parts of the mechanism.

B, $B^1$, $B^2$, $B^3$, &c., are a series of drills or bits arranged respectively in the ends of mandrels, C, $C^1$, $C^2$, $C^3$, &c., supported respectively by stationary puppet frames D, $D^1$, $D^2$, $D^3$, &c. Each drill is put in revolution by one of a series of endless belts E, $E^1$, $E^2$, $E^3$, &c., which passes around one of a series of pulleys F, $F^1$, $F^2$, $F^3$, &c., disposed and fixed respectively on the mandrels. Each belt also passes around one of a series of pulleys G, $G^1$, $G^2$, $G^3$, &c., fixed on a horizontal driving shaft H, disposed as seen in the drawings.

I, is what we term the lay beam or board. It is arranged with respect to the series of drills as seen in the drawings, and is supported at its two ends by universal joints K, L, on the tops of two swords M, N, or upright bars, each of which is hinged or jointed by a universal joint $a$, to one end of one of two levers O, P, which are united together at their other ends, and have a weight Q, placed upon them for the purpose of counterbalancing the weight of the lay beam and mechanism applied to it.

In the middle of the front face of the lay beam is a circular plate or gear wheel R, which is placed in opposition with the said beam, and attached to the beam by a screw or center pin S, so as to permit of the revolution of the plate on the said screw. There is also another and similar cogged wheel or plate T, or $T^1$, or $T^2$, affixed to the lay beam in a similar manner, and directly opposite each bitt or drill as seen in the drawings. Between each two of said gear wheels or plates there is a smaller gear or pinion U. The teeth of the said pinion, (which is made to revolve freely on a screw V, screwed in the lay beam,) are made to engage with the teeth of the wheels immediately adjacent to it, so that when the central cogged wheel or plate is turned on its center screw in either direction, all the other cogged wheels T, $T^1$, $T^2$, &c., will be simultaneously moved by it and the pinions in the same direction. A front view of a portion of the front face of the lay beam and one of the wheels T, $T^1$, &c., is represented in Fig. 6. Each of said wheels T, $T^1$, &c., is to have some contrivance applied to its front face for the purpose of holding in position and on the plate, a brush block W, see Fig. 2. That which we employ consists of two parallel rulers or bars, $b$, $c$, jointed at their ends to two other parallel bars $d$, $e$, (see Fig. 6) the said two bars $d$, $e$, being respectively made to turn upon centers or center pins $f$, $f$, inserted through them, and into the plate or gear wheel T or $T^1$, &c. One of the bars $d$, $e$, has a handle $g$, projecting from it, by laying hold of which a person may move the bar on its center pin, and thereby cause the two bars $b$, $c$, to approach toward or recede from one another in a manner similar to that in which an ordinary set of parellel rulers are made to operate together. If the joints are made to operate with a sufficient degree of stiffness, and the two internal edges of the bars $b$, $c$, are provided with suitable contrivances for grasping and holding a block, when one is placed between them the two bars may be moved so as to inclose it or hold it firmly as between two jaws.

The gear wheel or plate R, is provided with a similar contrivance for holding a pattern block or plate X, in whose front surface a series of holes or interstices are made, so as to be arranged in the same relation to each other as the holes we may desire to bore through each one of the brush blocks.

In conjunction with the pattern plate X, a pointer or index rod Y, is made to operate. It is sustained by a puppet frame Z, and so as to slide freely toward and from the said pattern plate, and be kept against it by a spring $h$, one end of which bears against a pin $i$, inserted in or through the rod Y, while the other end of said spring rests against the front standard of the said puppet frame Z. The forward end of the rod Y, is jointed to the upper end of an upright lever $k$, which turns at its foot or lower end, on a joint pin or fulcrum, and in a direction transversely of the machine. Said lever rests against one arm of a horizontal bent lever $m$, whose fulcrum is at $n$. The other arm of the bent lever $m$, is jointed to one end of a rod $o$, whose other end is also jointed to another transversed rod or lever $p$, which turns upon a center pin $q$, at its front end; the said rod $p$, being disposed as seen in the drawings. The other end of the rod $p$, plays in the groove of a sliding clutch $r$, placed on a horizontal shaft $s$, whose journals revolve in boxes $t, t$, arranged as seen in the drawings. On said shafts is a toothed pinion $u$, which is made to run loosely on the shaft, and to gear with a gear wheel $v$, fixed on another and longer horizontal shaft $w$, disposed above the shafts, as seen in the drawings. The clutch should be so made to operate in connection with the said pinion $u$, as to engage it with or disengage it from the shaft $s$, at pleasure, and in such manner that when so engaged and said shaft is put in revolution, the shaft will rotate the pinion, and thereby rotate the cam shaft $w$. The shaft $w$ has two cams $x, y$, placed upon it as seen in Figs. 1, 3, and 4. These cams operate against a lay or bar $a'$, which is placed directly in rear of the lay beam I, and is supported on two swords $b', c'$, which respectively turn at their lower ends on center pins so as to enable the bar $a'$ to be moved in directions toward or away from the lay beam I.

A spring $d'$, is connected with the rod or lever $p$, in such manner as to draw the clutch against or toward the pinion $u$, to the extent sufficient to clutch the said pinion to the shaft, and this whenever and while the lay beam I, is moved forward toward the drills or bitts, so as to cause them to bore into and through the several brush blocks. When the lay beam I, is moved forward so as to bear the pattern plate against the index rod V, the said index rod will be moved forward so as to carry with it the upper end of the lever $k$, and thereby leave the bent lever $m$, free to be turned on its fulcrum and permit the retraction of the spring $d'$ to the extent sufficient to operate or move the clutch in a manner proper to engage the pinion $u$, with its shaft. When the lay beam is moved back the opposite effect takes place; that is to say, the pinion is unclutched or disengaged from the shaft.

The shaft $s$, is revolved by a belt $e'$, which is made to pass around the pulleys $f', g$; the former of which is fixed on the driving shaft, while the latter is placed on the shaft $s$.

An annulus or ring $h'$, is attached by arms $i', i'$, &c, to the cogged wheel or plate R, as seen in the drawings. The attendant takes hold of this in order to rotate the wheel and pattern, and of course all the other cogged wheels on the lay beam.

A horizontal latch rod $k'$, is attached to the upper part of the lay beam I, by two links or bars $l' m'$, jointed to the beam so as to play up and down vertically. The said bar extends at its ends, beyond the said bars $l', m$; and rests in notches of two plates or racks $n', o'$, attached to the upper ends of the swords of the lay beam I; the whole being arranged as seen in the drawings. The latch rod $k'$ is kept in place in any two of said notches by means of one or more springs $p' p'$, connected to it and the swords of the lay beam. By means of such contrivances the lay beam may be adjusted to any desirable angle to the horizon, in order to cause the bitts to bore through the brush blocks in such inclined directions as may be necessary. The lay beams may be further balanced by weights $q', q'$, suspended on levers $r', r'$, attached to the lay beam by wires $s', s'$, and arranged as seen in the drawings.

By means of our machinery as above described it will be readily seen how easily the lay beam I, may be moved in any desirable direction, and its various positions for boring simultaneously in each position a hole through each brush block adjusted by the pattern plate and index rod. As soon as the attendant of the machine adjusts the index pointer or rod to any indent of the pattern plate, and draws the lay beam toward him so as to press the index rod against and cause it to move the lever $k$, the clutch $r$, will be thrown into action upon the pinion 22, and will engage it with its shaft, so as to cause the cams $x, y$, to revolve and force the bar $a'$, against the lay beam I, to the extent sufficient to enable the bitts to bore entirely through, or as far as may be necessary in their several brush blocks.

What we claim, as our invention is,

1. The above described machine or combination for boring brush blocks; the said combination consisting of, the series of revolving bitts, the index rod or pointer, the revolving pattern holder, patterns, block holders, and gear wheels, applied to the lay beam I, sustained by universal joints as specified, together with the lay bar $a'$, and other mechanism for forcing the lay beam and blocks, and pattern forward against the bitts; all substantially as hereinabove set forth.

2. And as auxiliary thereto, we claim to make the lay beam I, movable transversely in such manner as before explained, in order to cause the bitts to pass through the blocks in directions at such angles with the front face of each of them, as may be desirable to produce a proper spreading or flaring of the several bunches of bristles which may be inserted in them.

In testimony whereof we have hereto set our signatures this tenth day of April A. D. 1848.

SAMUEL TAYLOR.
ABBOT R. DAVIS.

Witnesses:
R. H. EDDY,
F. GOULD.